(12) United States Patent
Nakano et al.

(10) Patent No.: US 11,698,213 B2
(45) Date of Patent: Jul. 11, 2023

(54) HEAT EXCHANGER, INDOOR UNIT FOR AIR-CONDITIONER, AND REFRIGERATION DEVICE

(71) Applicant: DAIKIN INDUSTRIES, LTD., Osaka (JP)

(72) Inventors: Hiroyuki Nakano, Osaka (JP); Shouta Agou, Osaka (JP); Yasuhiro Sasai, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/836,428

(22) Filed: Jun. 9, 2022

(65) Prior Publication Data

US 2022/0299246 A1 Sep. 22, 2022

Related U.S. Application Data

(63) Continuation of application No. PCT/JP2020/033819, filed on Sep. 7, 2020.

(30) Foreign Application Priority Data

Dec. 11, 2019 (JP) ................................ 2019-223963

(51) Int. Cl.
 *F25B 47/00* (2006.01)
 *F28F 19/06* (2006.01)
 *F28F 21/08* (2006.01)

(52) U.S. Cl.
 CPC ............ *F25B 47/003* (2013.01); *F28F 19/06* (2013.01); *F28F 21/084* (2013.01);
 (Continued)

(58) Field of Classification Search
 CPC ............ F25B 47/003; F25B 2700/2116; F25B 2700/2117; F25B 13/00; F25B 39/04;
 (Continued)

(56) References Cited

U.S. PATENT DOCUMENTS

2006/0086486 A1 4/2006 Sudo
2009/0307898 A1* 12/2009 Dees ...................... B21D 39/06
29/727

FOREIGN PATENT DOCUMENTS

JP 2004061066 A * 2/2004
JP 2004170061 A * 6/2004 ........... B23K 1/0012
(Continued)

OTHER PUBLICATIONS

International Preliminary Report of corresponding PCT Application No. PCT/JP2020/033819 dated Jun. 23, 2022.
(Continued)

*Primary Examiner* — Harry E Arant
(74) *Attorney, Agent, or Firm* — Global IP Counselors, LLP (57) ABSTRACT

A heat exchanger includes a pipe made of aluminum, a thermistor, and an attaching portion with which the thermistor is attached to the pipe. The pipe carries a flow of refrigerant. The thermistor detects a temperature of the refrigerant. The pipe includes a sacrificial layer provided on a part of a surface of the pipe. The sacrificial layer is lower in potential than the aluminum of the pipe. The attaching portion is higher in potential than the sacrificial layer. At least one part of the attaching portion is attached to the surface of the pipe where the sacrificial layer is not provided. The attaching portion includes a brazed portion that is higher in potential than the sacrificial layer. The thermistor is attached to the pipe with the brazed portion.

17 Claims, 6 Drawing Sheets

(52) U.S. Cl.
CPC ............... *F25B 2700/2116* (2013.01); *F25B 2700/2117* (2013.01); *F28F 2275/04* (2013.01)

(58) Field of Classification Search
CPC ... F25B 2313/0314; F25B 39/02; F28F 19/06; F28F 21/084; F28F 2275/04; F28F 27/00; F24F 1/22; F24F 1/16; F24F 1/0067; F24F 11/89; F24F 2140/20; G01K 1/14; F28D 2021/0068
See application file for complete search history.

(56) References Cited

FOREIGN PATENT DOCUMENTS

| | | |
|---|---|---|
| JP | 4431361 B2 | 3/2010 |
| JP | 2013-194968 A | 9/2013 |
| JP | 2013194968 A * | 9/2013 |

OTHER PUBLICATIONS

International Search Report of corresponding PCT Application No. PCT/JP2020/033819 dated Oct. 20, 2020.
European Search Report of corresponding EP Application No. 20 89 7944.3 dated Nov. 22, 2022.

* cited by examiner

HEAT EXCHANGER, INDOOR UNIT FOR AIR-CONDITIONER, AND REFRIGERATION DEVICE

CROSS-REFERENCE TO RELATED APPLICATIONS

This is a continuation of International Application No. PCT/JP2020/033819 filed on Sep. 7, 2020, which claims priority to Japanese Patent Application No. 2019-223963, filed on Dec. 11, 2019. The entire disclosures of these applications are incorporated by reference herein.

BACKGROUND

Technical Field

The present disclosure relates to a heat exchanger, an indoor unit including the heat exchanger in an air conditioner, and a refrigeration apparatus including the heat exchanger.

Background Art

Japanese Patent Publication No. 2013-194968 discloses a heat exchanger including a tube into which a refrigerant flows and a fin attached to the tube. In this heat exchanger, a temperature sensitive element for detecting a temperature of the refrigerant is attached to the tube with a fixing member.

SUMMARY

In the heat exchanger described above, the fixing member is made of a constituent material that causes no electrolytic corrosion of the tube. Therefore, if the fixing member suffers corrosion, the temperature sensitive element occasionally falls off the tube.

An object of the present disclosure is to provide a heat exchanger that allows to suppress falling-off of a thermistor from a heat transfer tube made of aluminum.

A heat exchanger of the present disclosure is a heat exchanger including a pipe made of aluminum, a thermistor, and an attaching portion with which the thermistor is attached to the pipe. The pipe being is configured to carry a flow of refrigerant therein. The thermistor is configured to detect a temperature of the refrigerant. The pipe includes a sacrificial layer provided on apart of a surface of the pipe. The sacrificial layer is lower in potential than the aluminum of the pipe. The attaching portion is higher in potential than the sacrificial layer. At least one part of the attaching portion is attached to the surface of the pipe where the sacrificial layer is not provided. The attaching portion includes a brazed portion that is higher in potential than the sacrificial layer. The thermistor is attached to the pipe with the brazed portion.

In the heat exchanger according to the first aspect, at least one part of the attaching portion is attached to the surface of the pipe where the sacrificial layer is not provided. The heat exchanger according to the first aspect therefore allows to suppress falling-off of the thermistor from the pipe made of aluminum even when the sacrificial layer suffers corrosion.

DETAILED DESCRIPTION OF EMBODIMENT(S)

An example of the present disclosure will be described below with reference to the accompanying drawings. The following description mentions specific directions or positions using the terms including, for example, "upper", "lower", "right", "left", "front", and "rear" if necessary. It should be noted that these terms are only used for ease of understanding of the present disclosure referring to the drawings; therefore, the technical scope of the present disclosure is not limited by the meanings of the terms used herein. The following description is merely exemplary and illustrative in nature and is not intended to limit the present disclosure, a product to which the present disclosure is applied, or the use of the present disclosure. In addition, all the drawings give schematic illustrations in which dimensional ratios and the like are not necessarily equal to actual ones.

Figure 1:
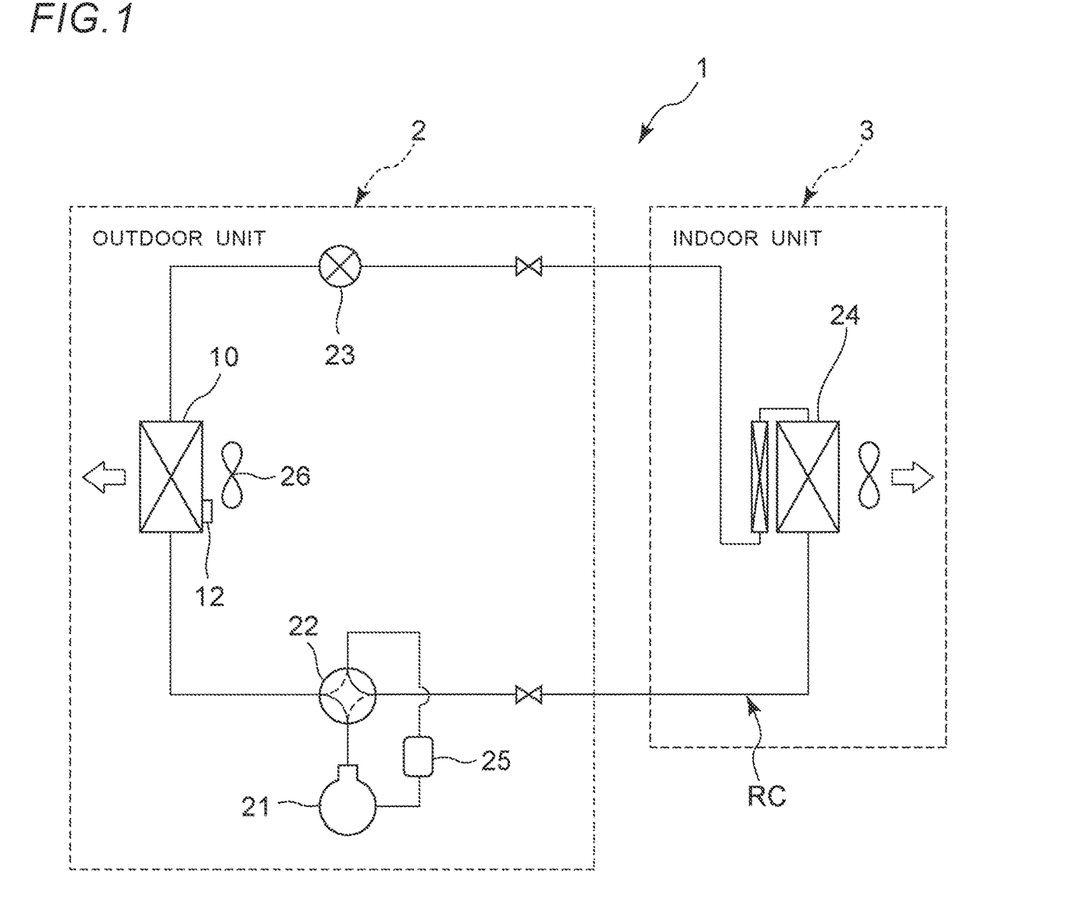
FIG. 1 is a circuit diagram of a refrigerant circuit of an air conditioner including a heat exchanger according to an embodiment of the present disclosure.

As illustrated in FIG. 1, for example, a heat exchanger 10 according to an embodiment of the present disclosure makes up a part of an outdoor unit 2 of an air conditioner 1 including an indoor unit 3 in addition to the outdoor unit 2.

The air conditioner 1 includes a refrigerant circuit RC including a compressor 21, a four-way switching valve 22, the heat exchanger 10 (hereinafter, simply referred to as a heat exchanger 10), an electric expansion valve 23, an indoor heat exchanger 24, and an accumulator 25 that are connected in a loop form. In the refrigerant circuit RC, when a refrigerant is discharged from the compressor 21, then the refrigerant flows through the four-way switching valve 22, the heat exchanger 10, the electric expansion valve 23, the indoor heat exchanger 24, and the accumulator 25. Thereafter, the refrigerant is sucked into the compressor 21.

Figure 2:
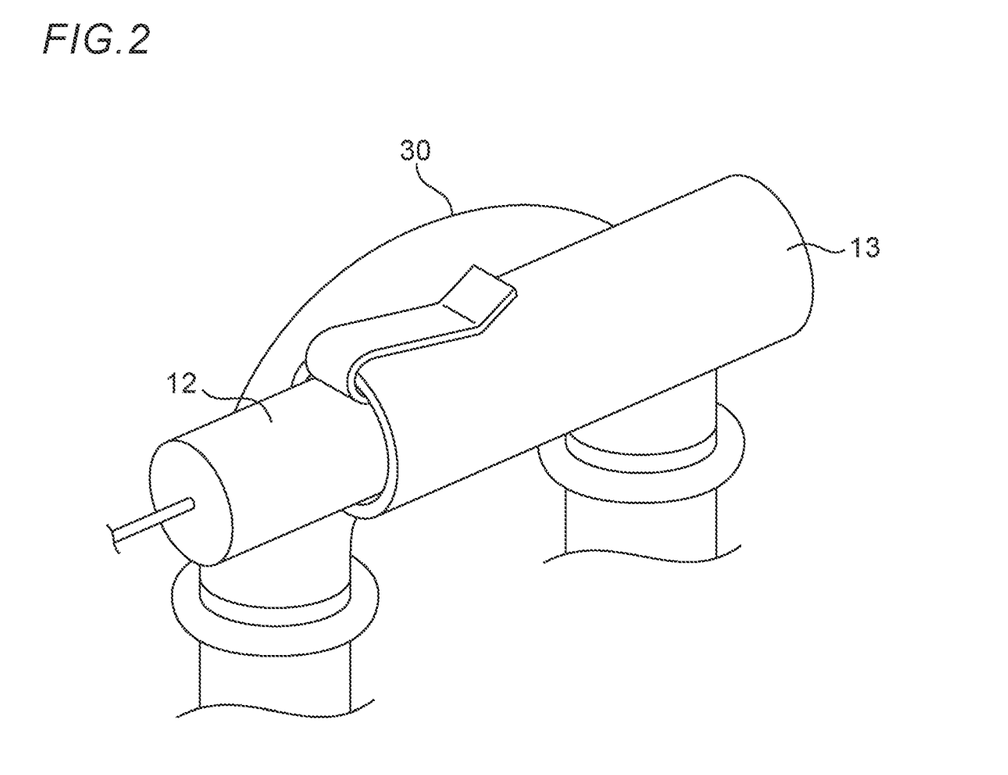
FIG. 2 is a perspective view of a thermistor attached to a heat transfer tube in the heat exchanger illustrated in FIG. 1.
Figure 3:
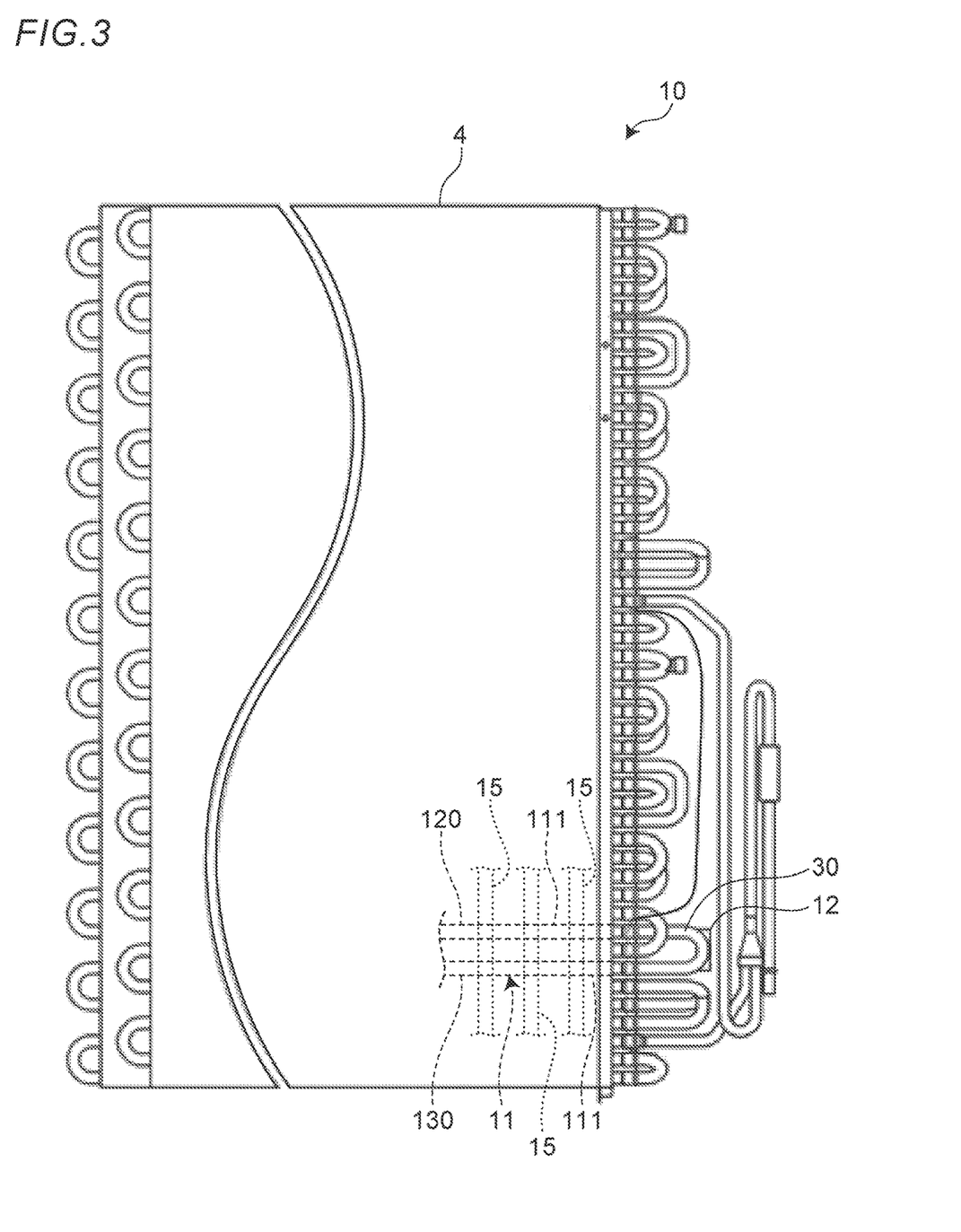
FIG. 3 is a plan view of the heat exchanger illustrated in FIG. 1.
Figure 4:
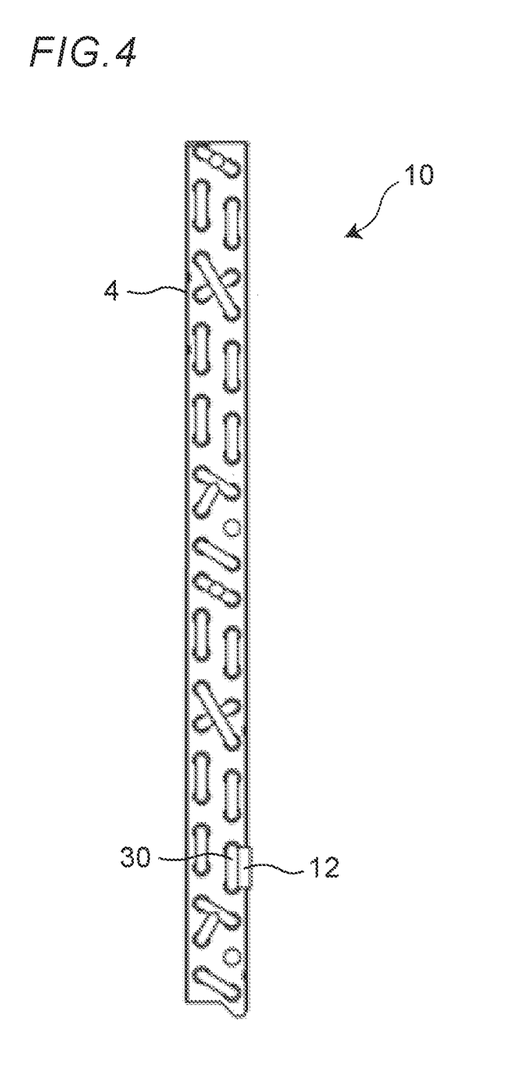
FIG. 4 is a side view of the heat exchanger illustrated in FIG. 1.

As illustrated in FIG. 2, the heat exchanger 10 includes a pipe 30 into which the refrigerant flows, a thermistor 12 that detects a temperature of the refrigerant, and a attaching portion 13 with which the thermistor 12 is attached to the pipe 30. As illustrated in FIGS. 3 and 4, for example, the heat exchanger 10 includes a heat exchange part 4 including a plurality of heat transfer tubes 11 each made of aluminum and a plurality of fins 15. As illustrated in FIG. 3, each of the heat transfer tubes 11 includes a portion 111 extending in a first direction (e.g., right and left direction in FIG. 3), and each fin 15 is attached to the portion 111. Each of the fins 15 has, for example, a plate shape and is made of aluminum such as A1100. The fins 15 extend in a second direction (e.g., up and down direction in FIG. 3) intersecting with the first direction while being arranged in the first direction at spacings.

As illustrated in FIG. 3, for example, the pipe 30 is a bent pipe having a substantially U shape. The pipe 30 includes two ends respectively connected to one ends of two heat transfer tubes 11 (e.g., a first heat tube 120 and a second heat transfer tube 130 illustrated in FIG. 3) among the plurality of heat transfer tubes 11.

Figure 5:
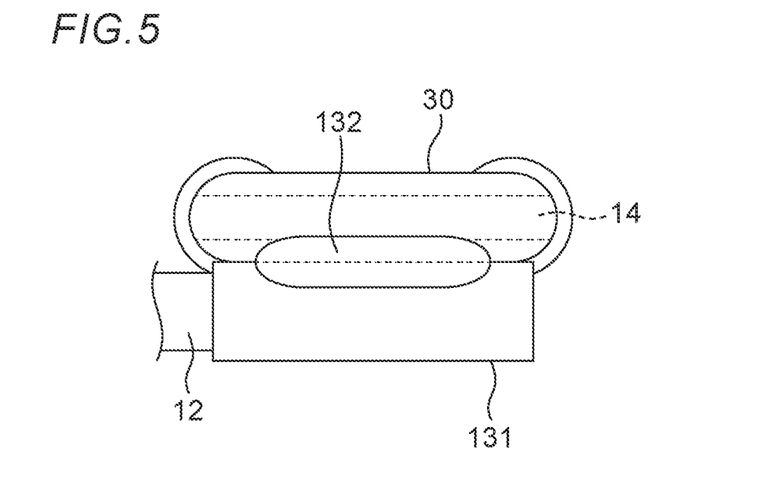
FIG. 5 is a top view of the thermistor attached to the heat transfer tube in the heat exchanger illustrated in FIG. 1.
Figure 6:
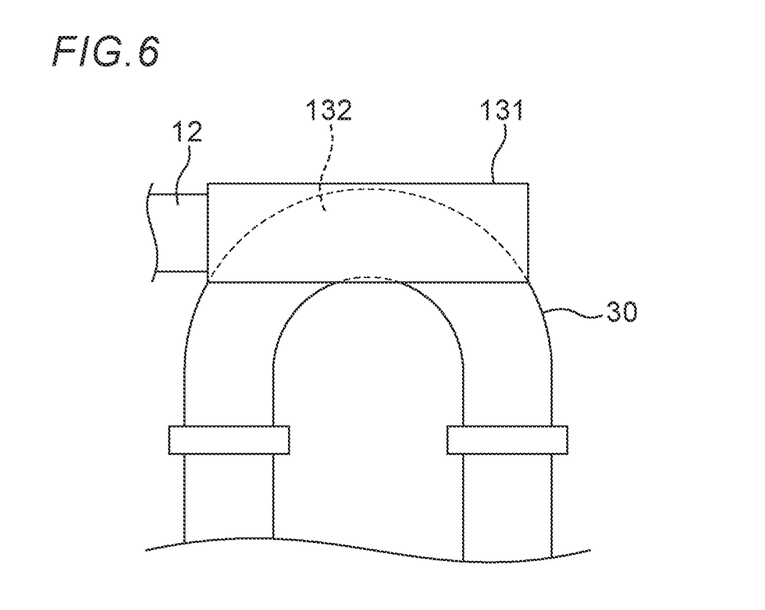
FIG. 6 is a plan view of the thermistor attached to the heat transfer tube in the heat exchanger illustrated in FIG. 1.

As illustrated in FIG. 2, for example, the thermistor 12 has a substantially columnar shape. As illustrated in FIGS. 5 and 6, the attaching portion 13 includes a thermistor attaching tube 131 and a brazed portion 132 with which the thermistor attaching tube 131 is attached to a surface of the pipe 30. In other words, the thermistor 12 is attached to the pipe 30 with the brazed portion 132.

As illustrated in FIG. 2, for example, the thermistor attaching tube 131 has a substantially columnar shape and is configured to be able to accommodate a part of the thermistor 12 inside thereof. As illustrated in FIG. 5, for example, the brazed portion 132 is configured to extend linearly. For example, the brazed portion 132 is formed by supplying a brazing material to a clearance between the surface of the pipe 30 and the thermistor attaching tube 131 and heating the brazing material with the flame of a burner.

As illustrated in FIG. 5, the pipe 30 includes a sacrificial layer 14 provided on a part of the surface of the pipe 30. The sacrificial layer 14 is lower in potential than the surface of the pipe 30. The sacrificial layer 14 is made of, for example, Zn, a Zn alloy, or an Al alloy containing Zn. The sacrificial layer 14 is formed on a surface of the pipe 30 by, for example, thermal spraying. The sacrificial layer 14 protects the pipe 30 from corrosion and allows to suppress corrosion of the surface of the pipe 30 for a long period of time.

In the heat exchanger 10, each of the pipe 30, the thermistor 12, and the thermistor attaching tube 131 is made of aluminum such as A3003. In other words, each of the pipe 30, the thermistor 12, and the thermistor attaching tube 131 is formed of the same potential material, is higher in potential than the sacrificial layer 14, and is lower in potential than the brazed portion 132. At least one part of the brazed portion 132 that makes up a part of the attaching portion 13 is attached to the surface of the pipe 30 where the sacrificial layer 14 is not provided.

As illustrated in FIG. 1, the air conditioner 1 includes an outdoor fan 26 that provides air to the heat exchanger 10. The outdoor fan 26 is disposed to provide air to the heat exchange part 4 of the heat exchanger 10. That is, air provided from the outdoor fan 26 to the heat exchanger 10 is hardly supplied to the pipe 30. As a result, the pipe 30 is a place where the pipe 30 is hardly corroded.

According to the heat exchanger 10 of this embodiment, the following advantageous effects can be achieved.

The attaching portion 13 is at least partially attached to a part of the surface of the pipe 30 where the sacrificial layer 14 is not provided. Therefore, even when the sacrificial layer 14 suffers corrosion, falling-off of the thermistor 12 from the pipe 30 made of aluminum can be suppressed.

The thermistor 12 is attached to the pipe 30 with the brazed portion 132. Therefore, the heat exchanger 10 allows to suppress falling-off of the thermistor 12 from the pipe 30 made of aluminum, with more reliability.

The brazed portion 132 has a linear shape. The attaching portion 13 is therefore easily attached to the surface of the pipe 30 where the sacrificial layer 14 is not provided. Hence, falling-off of the thermistor 12 from the pipe 30 made of aluminum can be suppressed with more reliability.

The thermistor 12 is located outside both ends of the fins 15 in the first direction. In other words, the thermistor 12 is disposed at a place where the thermistor 12 is hardly corroded. Therefore, falling-off of the thermistor 12 from the pipe 30 made of aluminum can be suppressed with more reliability.

The heat exchanger 10 achieves the outdoor unit 2 of the air conditioner 1, the outdoor unit 2 being capable of reliably detecting a temperature of the refrigerant flowing through the heat exchanger 10.

The heat exchanger 10 according to this embodiment may have the following configurations.

The pipe 30 is not limited to a bent pipe having a substantially U shape. The pipe 30 may have any shape.

The attaching portion 13 does not necessarily include the thermistor attaching tube 131 and the brazed portion 132. If necessary, the attaching portion 13 may include no thermistor attaching tube 131 so that the thermistor 12 is directly attached to the pipe 30 with the brazed portion 132. The attaching portion 13 may alternatively have another configuration.

Figure 7:
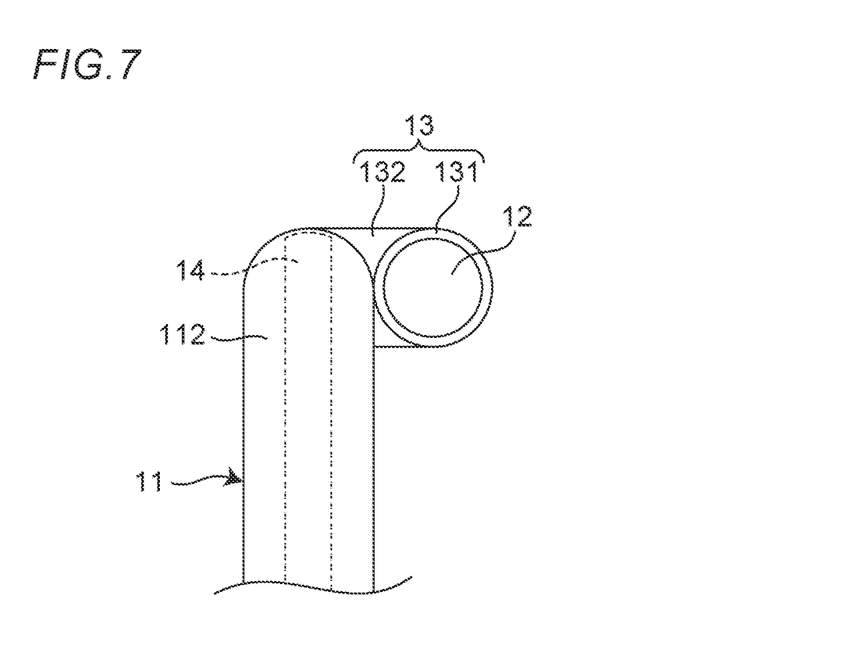
FIG. 7 is a side view of the thermistor attached to the heat transfer tube in a modification of the heat exchanger illustrated in FIG. 1.

The brazed portion 132 may have any shape in addition to a linear shape. As illustrated in FIG. 7, for example, the brazed portion 132 is formed to cover at least halfway around an outer surface of the thermistor attaching tube 131. This configuration thus ensures that failing-off of the thermistor 12 from the pipe 30 made of aluminum can be suppressed.

The present disclosure is applicable to a heat exchanger including the pipe 30 made of aluminum, the thermistor 12, and the attaching portion 13, for example, a heat exchanger 24 of the indoor unit 3. The present disclosure thus achieves the indoor unit 3 of the air conditioner 1, the indoor unit 3 being capable of reliably detecting a temperature of the refrigerant flowing through the heat exchanger 24.

The heat exchanger 10 is also applicable to another refrigeration apparatus such as a hot water supply apparatus or a heat pump chiller, in addition to the outdoor unit 2 of the air conditioner 1. The heat exchanger 10 achieves a refrigeration apparatus capable of reliably detecting a temperature of the refrigerant flowing through the heat exchanger 10.

Among the foregoing various embodiments or modifications, an appropriate combination of given embodiments or modifications produces advantageous effects of the respective embodiments or modifications. It should be understood that the present disclosure encompasses a combination of embodiments, a combination of working examples, a combination of an embodiment with a working example, and a combination of features of different embodiments or working examples.

The invention claimed is:

1. A heat exchanger comprising:
 a pipe made of aluminum, the pipe being configured to carry a flow of refrigerant therein;
 a thermistor configured to detect a temperature of the refrigerant; and
 an attaching portion with which the thermistor is attached to the pipe, the pipe including a sacrificial layer provided on a part of a surface of the pipe, the sacrificial layer being lower in potential than the aluminum of the pipe, the part of the surface of the pipe where the sacrificial layer is provided being smaller than an entirety of the surface of the pipe,
 the attaching portion being higher in potential than the sacrificial layer,
 at least one part of the attaching portion being attached to the surface of the pipe where the sacrificial layer is not provided, the at least one part of the attaching overlapping the surface of the pipe where the sacrificial layer is not provided,
 the attaching portion including a brazed portion that is higher in potential than the sacrificial layer, and the thermistor being attached to the pipe with the brazed portion.

2. The heat exchanger according to claim 1, wherein the brazed portion has a linear shape.

3. An outdoor unit of an air conditioner including the heat exchanger according to claim 2.

4. An indoor unit of an air conditioner including the heat exchanger according to claim 2.

5. A refrigeration apparatus including the heat exchanger according to claim 2.

6. An outdoor unit of an air conditioner including the heat exchanger according to claim 1.

7. An indoor unit of an air conditioner including the heat exchanger according to claim 1.

8. A refrigeration apparatus including the heat exchanger according to claim 1.

9. A heat exchanger comprising:
a pipe made of aluminum, the pipe being configured to carry a flow of refrigerant therein;
a thermistor configured to detect a temperature of the refrigerant; and
an attaching portion with Which the thermistor is attached to the pipe,
the pipe including a sacrificial layer provided on a part of a surface of the pipe, the sacrificial layer being lower in potential than the aluminum of the pipe, the part of the surface of the pipe where the sacrificial layer is provided being smaller than an entirety of the surface of the pipe,
the attaching portion being higher in potential than the sacrificial layer,
at least one part of the attaching portion being attached to the surface of the pipe where the sacrificial layer is not provided, the at least one part of the attaching portion overlapping the surface of the pipe where the sacrificial layer is not provided,
the thermistor being made of aluminum, and
the attaching portion including a thermistor attaching tube made of a material equal in potential to the aluminum of the thermistor.

10. An outdoor unit of an air conditioner including the heat exchanger according to claim 9.

11. An indoor unit of an air conditioner including the heat exchanger according to claim 9.

12. A refrigeration apparatus including the heat exchanger according to claim 9.

13. A heat exchanger comprising:
a pipe made of aluminum, the pipe being configured to carry a flow of refrigerant therein;
a thermistor configured to detect a temperature of the refrigerant;
an attaching portion with which the thermistor is attached to the pipe,
a heat transfer tube to which the pipe is connected; and
a plurality of fins attached to the heat transfer tube,
the pipe including a sacrificial layer provided on a part of a surface of the pipe, the sacrificial layer being lower in potential than the aluminum of the pipe, the part of the surface of the pipe where the sacrificial layer is provided being smaller than an entirety of the surface of the pipe,
the attaching portion being higher in potential than the sacrificial layer,
at least one part of the attaching portion being attached to the surface of the pipe where the sacrificial layer is not provided, the at least one part of the attaching portion overlapping the surface of the pipe where the sacrificial layer is not provided
the heat transfer tube including a portion
that extends in a first direction and
to which each of the plurality of fins is attached, each of the plurality of fins
extending in a second direction intersecting the first direction and
being arranged along the first direction at spacings, and
the pipe being located outside both ends of the plurality of fins along the first direction.

14. An outdoor unit of an air conditioner including the heat exchanger according to claim 13.

15. An indoor unit of an air conditioner including the heat exchanger according to claim 13.

16. A refrigeration apparatus including the heat exchanger according to claim 13.

17. A heat exchanger comprising:
a pipe made of aluminum, the pipe being configured to carry a flow of refrigerant therein;
a thermistor configured to detect a temperature of the refrigerant; and
an attaching portion with which the thermistor is attached to the pipe,
the pipe including a sacrificial layer provided on a part of a surface of the pipe, the sacrificial layer being lower in potential than the aluminum of the pipe, the part of the surface of the pipe where the sacrificial layer is provided not extending around an entire circumference the pipe,
the attaching portion being higher in potential than the sacrificial layer,
at least one part of the attaching being attached to the surface of the pipe where the sacrificial layer is not provided,
the attaching portion including a brazed portion that is higher in potential than the sacrificial layer, and
the thermistor being attached to the pipe with the brazed portion.

* * * * *